May 11, 1954  K. POLASEK  2,678,414
SERVOMOTOR
Filed Nov. 21, 1950

INVENTOR
Karl Polasek
By Robert B. Pearson
ATTORNEY

Patented May 11, 1954

2,678,414

UNITED STATES PATENT OFFICE 2,678,414

SERVOMOTOR

Karl Polasek, Trollbacken, Sweden, assignor to Aero Materiel AB., Stockholm, Sweden, a corporation of Sweden Application November 21, 1950, Serial No. 196,734

7 Claims. (Cl. 318—8)

This invention refers to a servomotor with a lower time constant, shorter transition period and higher sensitivity than has hitherto been possible. It comprises, substantially, a pair of identical D. C. motors, which are mechanically and electrically interconnected.

There will be described by way of example two embodiments of the invention with reference to the accompanying drawings, in which.

Figure 2:
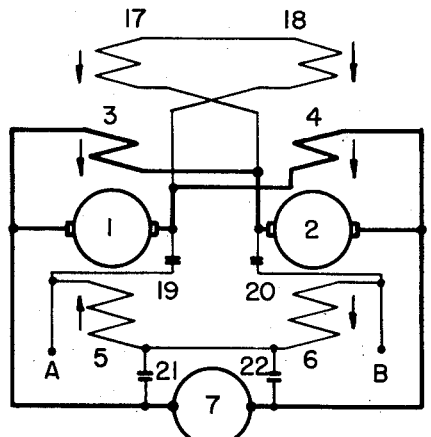
Fig. 2 is a schematic circuit diagram of a double servomotor with parallel feedback.
Figure 1:
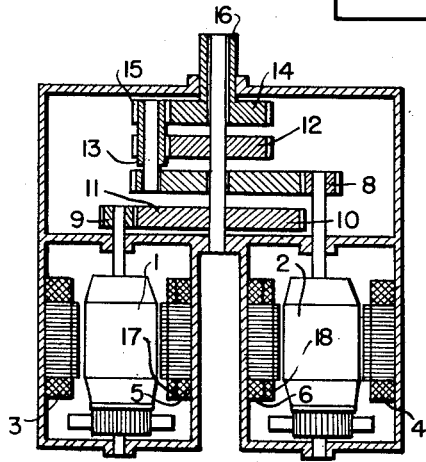
Fig. 1 is a section showing the mechanical construction of a double servomotor according to the invention.

In the Figs. 1 and 2 arrangement, a pair of rotors 1 and 2 are mechanically interconnected through a differential gearing comprising gears 8 to 15, in such a way that the terminal axle 16 will rotate at a rate proportional to the difference between the rates of rotors 1 and 2.

As is apparent from Fig. 2, rotors 1 and 2 are connected in parallel to a D. C. source 7 of fixed voltage U.

A pair of control windings 5 and 6 are connected in series and are fed with the regulating current via terminals A and B, so that winding 5 will weaken the field of rotor 1 in the same degree as winding 6 will strengthen the field of rotor 2. In series with each one of rotors 1 and 2 is coupled a field winding 4 or 3, respectively, which produces a part or the whole of the basic field of the motor thereby giving the two motors the same basic speed of revolution. Furthermore, a pair of windings 17 and 18 are connected in series between the junction of rotor 2 and winding 3 on the one hand and that of rotor 1 and winding 4 on the other. Windings 3, 4, 17, and 18 are so dimensioned as to maintain a suitable basic speed of revolution when the regulating current is zero.

The abovementioned junctions are further connected each through one of condensers 19 and 20 with a respective terminal A and B and thus with windings 5 and 6, whose junction is further connected through condensers 21 and 22 with the terminals of current source 7.

The servomotor operates as follows. As long as control windings 5 and 6 carry no current, both rotors will turn at the same basic rate. Differential axle 16 will then be at a standstill.

If a control current is applied to windings 5 and 6 the field of rotor 1, for instance, will grow weaker and that of rotor 2 stronger. Rotor 1 will then draw a heavier current, thus further strengthening the field of rotor 2, which will in turn draw less current and still further weaken the field of rotor 1.

At the same time the charging current of condensers 19 and 20 produces a phase-displaced equalizing current in windings 3 and 4, owing to the occurrence of a control voltage between A and B, as well as in windings 5 and 6, owing to the initiated changes in the voltages of rotors 1 and 2. Both kinds of changes further weaken the field of rotor 1 and strengthen that of rotor 2. This causes a very sudden change in speed of the rotors, causing rotor 1 to have a higher and rotor 2 to have a lower speed. The differential axle 16 with its loading torque will then be accelerated very quickly to a fresh state of balance.

Figure 3:
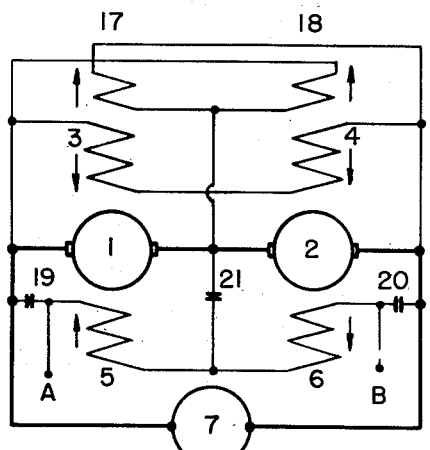
Fig. 3 is a similar diagram of a motor with series feedback.

In the embodiment of Fig. 3 rotors 1 and 2 in series are connected to a D. C. source 7 of fixed voltage V. A pair of field windings 3 and 4 are connected to produce the basic fields of rotors 1 and 2 so that both rotors have the same basic speed. A pair of control windings 5 and 6 are connected in series to carry the regulating current applied through terminals A and B, the arrangement being such that windings 5 weakens the field of rotor 1 to the same extent that winding 6 strengthens the field of rotor 2. A pair of windings 17 and 18 are cross-connected as indicated to the terminals of rotors 2 and 1, respectively, so as to counteract the fields of the field windings 3 and 4, respectively. Thus, the differences of the fields of windings 3 and 17 on the one hand and windings 4 and 18 on the other maintain the basic fields in the absence of a regulating current.

Condenser 19 is connected between terminal A and rotor 1 and condenser 20 between terminal B and rotor 2, as indicated. Condenser 21 is connected between the junction of the rotors and that of windings 5 and 6.

As long as the regulating current is zero, both rotors have the same basic speed and differential axle 16 is at a standstill. When a regulating current appears in windings 5 and 6, there is an instantaneous weakening in, for instance, the field of rotor 1 and a strengthening in that of rotor 2. The electromotive force of rotor 1 rises instantaneously and that of rotor 2 correspondingly drops off. The fields of windings 3 and 18 grow weaker, that one of windings 4 and 17 stronger.

At the same time there arises on account of the voltage fluctuations of the rotors a phase-displaced equalizing current through condensers 19, 21, and 20, 21, respectively, whereby the influence of the regulating current in windings 5 and 6 is increased. The basic field drops with extreme suddenness in rotor 1 and rises in rotor 2. The rotor currents are constant as far as linear conditions are concerned. Rotor 2 accelerates rotor 1 to a fresh state of balance.

It is also possible to connect control windings 3 and 4 in parallel to the regulating voltage or separately to a pair of voltages. Windings 17 and 18 or condensers 19 to 22 could also be used separately for accelerating purposes. Also, series connection without feed-back makes for a lower time constant.

The servomotor is particularly suited for quickly leveling antiaircraft guns or for remote control purposes. It will be understood that the shown embodiments are merely examples and that various modifications thereof are possible within the scope of the appended claims.

What is claimed is:

1. A servomotor including a current source and a regulating voltage comprising, a pair of substantially identical D. C. motors connected to said current source and mechanically interconnected by means of a differential gearing, the outgoing axle of said differential gearing being adapted to deliver the output energy of said servomotor, field windings for the rotors of said servomotor including series windings and control windings, the series winding of the second rotor being connected in series with the first rotor and said current source and said series winding of said first rotor being connected in series with said second rotor and said current source, and the control windings being connected to said regulating voltage, whereby the one of said control windings strengthens and the other of said control windings weakens the basic field of said rotor windings.

2. A servomotor according to claim 1, in which a pair of auxiliary field windings for said rotors are connected in series between the junctions of one of said rotors and the field winding of the other of said rotors connected in series therewith, said auxiliary windings being so proportioned as to provide with said series-connected field windings a suitable basic speed of rotation for said rotors in the absence of a regulating current.

3. A servomotor according to claim 1, in which each of said control windings is connected by means of condensers to the corresponding rotor.

4. A servomotor regulated by a control voltage comprising a pair of substantially identical D. C. rotors connected to a current source and mechanically interconnected by means of a differential gearing, the output shaft of said differential gearing adapted to deliver the output energy of said servomotor, field windings for each of said rotors consisting of a series winding a parallel winding, and a control winding, the series winding of the first rotor being connected in series with the second of said rotors and vice versa, both the parallel windings connected together in series and at one end to the terminal between the first rotor and the second series winding and at the other end to the terminal between the second rotor and the first series winding, both the control windings connected in series with the control voltage supply, all said portions of the field windings connected so that a decrease of a control voltage induces an amplified decrease of the field of the first rotor and an amplified increase of the field of the second rotor or vice versa.

5. A servomotor according to claim 4, the joint between the first rotor and the second series winding connected through a condenser with the input terminal of the first control winding, the joint between the second rotor and the first series winding connected through a condenser with the input terminal of the second control winding and the joint between both the control windings connected by condensers with the output terminals of the motor voltage supply.

6. A servomotor comprising a pair of substantially identical D. C. rotors connected to a current source and mechanically interconnected by means of a differential gearing, the output shaft of said differential gearing being adapted to deliver the output energy of said servomotor, the rotors of said motor connected in series with the motor voltage supply, a field winding in each of the said rotors consisting of a basic winding, a backfeed winding and a control winding, both the basic windings connected in series to the motor voltage supply, the first backfeed winding connected to the terminals of the second rotor and the second back-feed winding connected to the terminals of the first rotor, both the control windings connected in series with the control voltage supply, all said portions of the field windings connected so that a decrease of a control voltage induces an amplified decrease of the field of the first rotor and an amplified increase of the field of the second rotor or vice versa.

7. A servomotor according to claim 6, the joint between the rotors connected by a condenser to the joint between both the control windings and the input terminals of the control windings connected by condensers with the output terminals of the motor supply voltage.

References Cited in the file of this patent

UNITED STATES PATENTS

| Number | Name | Date |
|---|---|---|
| 436,127 | Edison | Sept. 9, 1890 |
| 1,975,023 | Sertillange | Sept. 25, 1934 |
| 2,384,776 | Trofimov | Sept. 11, 1945 |
| 2,436,582 | Lear | Feb. 24, 1948 |
| 2,491,842 | Wells | Dec. 20, 1949 |

FOREIGN PATENTS

| Number | Country | Date |
|---|---|---|
| 338,226 | Germany | June 15, 1921 |